July 11, 1939.　　　S. A. OLIVER　　　2,165,297

VEHICLE ENGINE MOUNT

Filed Oct. 20, 1937

INVENTOR
STEPHEN A. OLIVER
BY
ATTORNEYS

Patented July 11, 1939

2,165,297

UNITED STATES PATENT OFFICE 2,165,297

VEHICLE ENGINE MOUNT

Stephen A. Oliver, Culver City, Calif.

Application October 20, 1937, Serial No. 170,040

4 Claims. (Cl. 248—5)

(Granted under the act of March 3, 1883, as amended April 30, 1928; 370 O. G. 757)

The invention described herein may be manufactured and used by or for the Government for governmental purposes, without the payment to me of any royalty thereon.

This invention has reference to vehicle engine mounts and particularly to a novel method and means of lashing the engine to the vehicle to hold it in place if and when, for any reason, it were to be torn loose from its mount.

The invention is especially applicable to aircraft engine mounts wherein the forces set up by excess vibration due to propeller failure and other causes can and do tear the engine loose from its mounting, and it provides means for holding the engine in place while a landing is made.

By reason of the invention, the loss of or damage to property as well as the risk to life and limb occasioned by a loose or falling engine is avoided.

The invention will be more fully understood upon reference to the accompanying drawing, wherein.

Figure 1:
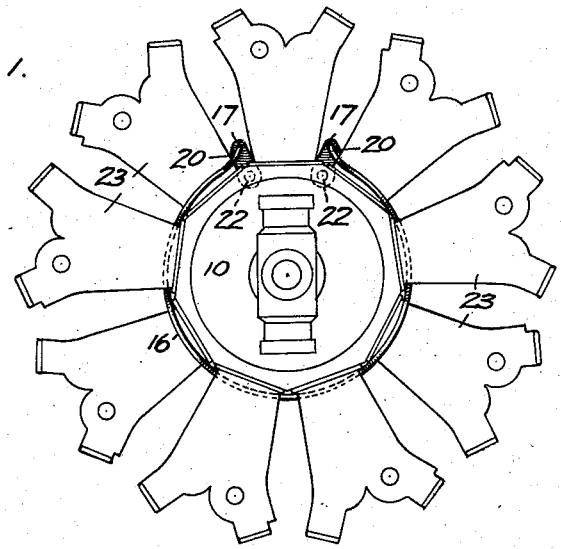
Figure 1 is a front view of an aircraft engine installation embodying the invention.
Figure 3:
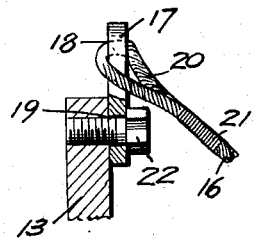
Figure 3 is a detail view.

The showing of the aircraft engine installation is merely conventional. A radial type engine 10 has its crank case or base casting 11 bolted or otherwise secured at 12 to the engine mounting ring 13 of the supporting structure or mount 14; the latter being secured to or forming a part of the main structure or fuselage 15. In aircraft, the causes of excess vibration, which might result in breakage or failure of the mounting bolts 12 and in the engine being torn away entirely from the mount 13 are many. In accidents of this type, aside from personal hazards, usually the engine is a total loss and the fuselage of the aircraft is considerably damaged, as well.

Figure 4:
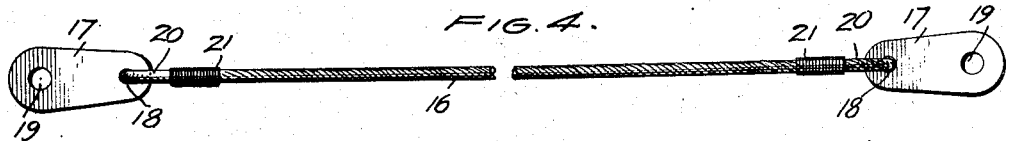
Figure 4 is a plan view of the engine sling or cable.

To avoid all such risks and dangers, the present invention provides for lashing or binding the engine to the top of the engine mount, nacelle, wing beam, fuselage, or nearest main structure, using a flexible sling or lashing such as illustrated in Figure 4. The sling or lashing consists of a flexible steel cable 16 having a chrome-molyb steel fitting or cable-anchoring member 17 at each end thereof, the length of the cable being appropriate to the size of the engine on which it is used. Each fitting may be a flat steel plate slightly tapered in plan form and apertured to provide an eye 18 in the narrow end and a bolt hole 19 in the wide end. The eye 17 receives the end part of the cable which is bent into a loop 20 spliced or otherwise secured to the standing part of the cable as shown at 21. The bolt hole 18 receives the shank of one of a pair of screw bolts 22 by means of which the cable anchoring member is bolted to the top of the engine mount, nacelle, wing beam, fuselage or nearest main structure in accordance with the particular location and installation of the aircraft engine. In the embodiment herein disclosed, the cable-anchoring members are attached, by the screw bolts 22 to the top of the ring 13 of the engine mount 14. The engine mounting-ring 13 and the cable-anchoring members 17 are thereby separately connected to facilitate the attachment or removal of the safety cable and the bolts serves as pivots about which the members 17 can be angularly adjusted, prior to tightening the bolts, toward or away from each other for tightening or loosening the cable about the engine.

Figure 2:
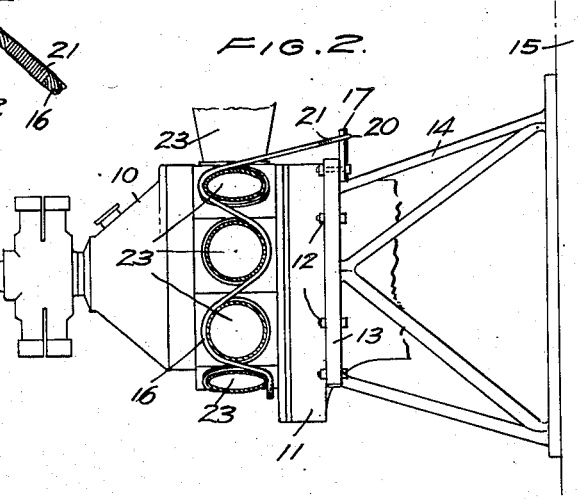
Figure 2 is a side view thereof, partly in section.

In applying the sling or lashing to the engine and the engine support, the cable 16 is interwoven between the cylinders 23, as shown in Figures 1 and 2, and the attaching fittings 17 are bolted to the engine mount or fuselage structure. The cable should be wrapped loosely and sinuously around the cylinders and crank case of the engine and yet be tight enough so that if all the engine mounting bolts 12 are removed the engine would be held by the cable to within a few inches of its normal position. The cable, therefore, will prevent the engine from being torn loose from its mount and falling out of the aircraft and upon failure of the mounting bolts 12 it will hold the engine in place until a landing is accomplished. This safety cable can be applied, in the method above described, to any radial, in-line, V or other type engine.

For lighter-than-air craft installations, the flexible cable is wrapped in the manner described around the engine and secured, preferably above the engine, to the nearest main structure or to any other suitable and convenient structure.

Having thus described the invention, what I claim is:

1. In an engine installation, an engine mount, a multi-cylindered engine having a rigid connection with the engine mount to be supported thereby, and a flexible safety cable secured at its ends to the engine mount and between its secured ends extending sinuously around the cylinders of the engine for holding the latter in the event the rigid connection fails.

2. In an engine installation, an engine mount, a multi-cylindered engine having a rigid connection with the engine mount to be supported thereby, and a flexible safety cable extending around the engine and sinuously of the engine cylinders and having the ends so secured to the engine mount as to maintain the cylinder-engaging portions of the cable loosely around the cylinders and yet tight enough to restrain the engine against more than a comparatively slight displacement from its normal position in the event the rigid connection fails.

3. In an engine installation, an engine mount, a multi-cylindered engine secured to the mount by a rigid supporting connection between the mount and the base of the engine, and a flexible safety cable having its ends separately fastened to the mount at one side of the engine base and between its fastened ends extending around the base and sinuously of the cylinders of the engine for holding the latter to the mount in the event the rigid connection fails.

4. In an aircraft radial engine installation, an engine supporting structure having an engine mounting ring, a radial engine fastened to said ring to be supported by the said structure, a pair of cable-anchoring members mounted on the said ring, and a flexible safety cable secured at its ends to the said cable-anchoring members and between its ends extending in a loop around the engine and sinuously of the cylinders thereof for holding the engine to the supporting structure in the event of failure of the fastening means between the engine and the mounting ring, the said cable anchoring members being adjustable for altering the spacing between the ends of the cable whereby variably to loosen or to tighten the cable about the engine.

STEPHEN A. OLIVER.